United States Patent
Wee et al.

(10) Patent No.: US 9,979,969 B2
(45) Date of Patent: May 22, 2018

(54) METHOD AND SYSTEM FOR IMAGE COMPRESSION USING IMAGE BLOCK CHARACTERISTICS

(71) Applicants: Fingram Co., Ltd., Suwon-si, Gyeonggi-do (KR); Quram Co., Ltd., Suwon-si, Gyeonggi-do (KR)

(72) Inventors: Young Cheul Wee, Suwon-si (KR); Young Hoon Ahn, Suwon-si (KR); Moo Jae Lee, Suwon-si (KR)

(73) Assignees: FINGRAM CO., LTD., Seoul (KR); QURAM CO., LTD., Seoul (KR)

( * ) Notice: Subject to any disclaimer, the term of this patent is extended or adjusted under 35 U.S.C. 154(b) by 229 days.

(21) Appl. No.: 14/696,318

(22) Filed: Apr. 24, 2015

(65) Prior Publication Data

US 2016/0316204 A1    Oct. 27, 2016

(51) Int. Cl.
| | |
|---|---|
| *H04N 19/124* | (2014.01) |
| *H04N 19/14* | (2014.01) |
| *H04N 19/176* | (2014.01) |
| *H04N 19/126* | (2014.01) |
| *H04N 19/625* | (2014.01) |

(52) U.S. Cl.
CPC .......... *H04N 19/14* (2014.11); *H04N 19/126* (2014.11); *H04N 19/176* (2014.11); *H04N 19/625* (2014.11)

(58) Field of Classification Search
None
See application file for complete search history.

(56) References Cited

U.S. PATENT DOCUMENTS

| | | | | |
|---|---|---|---|---|
| 4,386,366 A | * | 5/1983 | Mori ................ | H04N 19/50 348/420.1 |
| 5,285,275 A | * | 2/1994 | Abe .................. | H04N 9/8042 348/472 |
| 5,448,297 A | * | 9/1995 | Alattar ................ | H04N 7/54 375/240.12 |
| 5,552,829 A | * | 9/1996 | Kim ................... | G11B 27/005 375/240.04 |
| 5,861,921 A | * | 1/1999 | Shimizu ............. | H04N 19/176 375/240.04 |
| 5,949,956 A | * | 9/1999 | Fukuda .............. | H04N 5/9264 348/384.1 |

(Continued)

FOREIGN PATENT DOCUMENTS

KR    10201220091873 B1    3/2014

*Primary Examiner* — Mohammed Rahaman
(74) *Attorney, Agent, or Firm* — Knobbe Martens Olson & Bear LLP (57) ABSTRACT

Method and system for adaptive image compression using block characteristics are provided. For adaptive image compression, blocks in an image are quantized and compressed using a quantization table that was used in quantization of the blocks. An image compression system checks a block-characteristics quantization table corresponding to a specific block in the image to be compressed in order to quantize the specific block, and performs calculation using a value of a first element of the quantization table corresponding to a specific element of the specific block and a value of a second element of the checked block-characteristics quantization table corresponding to the specific element in order to quantize the specific element.

13 Claims, 6 Drawing Sheets

Quantization Table $$\begin{bmatrix} q_0 & q_1 & \cdots & q_7 \\ & \cdots (\widetilde{q_i}) \cdots & \\ q_{56} & \cdots & q_{63} \end{bmatrix} \sim 1$$

Block-Characteristics Quantization Table $$\begin{bmatrix} q'_0 & q'_1 & \cdots & q' \\ & \cdots (\widetilde{q'_i}) \cdots & \\ q'_{56} & \cdots & q'_{63} \end{bmatrix} \sim 2$$

DCT Coefficient Error in Quantization ↓

$$\boxed{\dfrac{q_i}{2} + pq_i}$$

≤

DCT Coefficient Error in Quantization ↓

$$\boxed{\dfrac{q'_i}{2}}$$

(56) References Cited

U.S. PATENT DOCUMENTS

| | | | | |
|---|---|---|---|---|
| 6,055,339 A * | 4/2000 | Wilkinson | ............ | H04N 5/9264 375/240.03 |
| 6,097,737 A * | 8/2000 | Takizawa | .................. | H04J 1/08 370/480 |
| 2001/0020905 A1* | 9/2001 | Gatepin | ................. | H04N 19/60 341/50 |
| 2006/0104531 A1* | 5/2006 | Smith | ..................... | H04N 19/15 382/251 |
| 2012/0183053 A1* | 7/2012 | Lu | ......................... | H04N 19/176 375/240.03 |
| 2014/0003497 A1* | 1/2014 | Sullivan | ................. | H04N 19/70 375/240.03 |
| 2014/0023286 A1* | 1/2014 | Du | ....................... | H04N 19/176 382/233 |
| 2014/0056516 A1* | 2/2014 | Wee | .......................... | G06T 9/00 382/166 |

\* cited by examiner

METHOD AND SYSTEM FOR IMAGE COMPRESSION USING IMAGE BLOCK CHARACTERISTICS

BACKGROUND

The present disclosure generally relates to data image compression method and system using block characteristics.

A variety of traditional image compression methods are well known in the art, among which joint photographic experts group (JPEG) compression is most popular. JPEG compression is widely used as the standard of technology for compressing and expressing images.

SUMMARY

Various aspects of the present invention provide an adaptive image compression method and system able to adaptively compress a number of blocks included in an image to be compressed at different ratios considering the characteristics of each block even in the case in which a single quantization table is used for the quantization of the number of blocks of the image to be compressed.

Also provided are an adaptive image compression method and system able to significantly improve a compression rate by compressing the number of blocks of the image in a single time by determining the characteristics of each block and subsequently deciding the quantization level suitable to each block and/or the degree to which a discrete cosine transform (DCT) is adjusted instead of iterating compression (adjusting a quantized DCT coefficient) and subsequent determination of whether or not the result of the compression is within the range of similar image quality.

In an aspect of the present invention, provided is an adaptive image compression method of quantizing blocks included in an image to be compressed using a quantization table commonly used in quantization of the blocks. The method includes: checking, at an image compression system, a block-characteristics quantization table corresponding to a specific block of the blocks included in the image in order to quantize the specific block; and quantizing the specific block using a value of an element included in the quantization table and a value of an element included in the block-characteristics quantization table.

The method may include, in order to quantize a specific element of the specific block, quantizing the specific block comprises performing calculation using a value of a first element of the quantization table corresponding to a specific element and a value of a second element of the checked block-characteristics quantization table corresponding to the specific element. In embodiments of the method, performing calculation using the value of the first element of the quantization table corresponding to the specific element and the value of the second element of the checked block-characteristics quantization table corresponding to the specific element block-characteristics quantization table can comprises: calculating, at the image compression system, an additional compression value decided based on the value of the first element and the value of the second element; and calculating, at the image compression system, a final quantization result value by deducting the additional compression value from a value obtained by quantizing the specific element based on the value of the first element.

In embodiments of adaptive image compression method, at the process of calculating the additional compression value decided based on the value of the first element and the value of the second element, the additional compression value satisfies the following formula, $q_i/2 + pq_i \le q'_i/2$, where $q_i$ is the value of the first element, p is the additional compression value, $q'_i$ is the value of the second element, and i is an index of the elements.

The adaptive image compression method may include comprising calculating, at the image compression system, a characteristic value of the specific block, wherein checking the block-characteristics quantization table corresponding to the specific block comprises checking the block-characteristics quantization table previously decided based on the characteristic value. In embodiments of adaptive image compression method, calculating the characteristic value of the specific block may include calculating, at the image compression system, an average of each of differential values of the pixels included in the specific block as the characteristic value, wherein each of the differential values is an average of differences between a pixel value of the specific pixel and pixel values of pixels surrounding the specific pixel.

In embodiments, an adaptive image compression method can include calculating, at the image compression system, characteristic values of the blocks included in the image to be compressed and deciding the quantization table based on each of the characteristic values of the blocks.

In embodiments of adaptive image compression method, quantizing the specific block can include calculating a value obtained by deducting an additional compression value from a result obtained by quantizing a at least one element of the specific block using the quantization table as a final quantization result value of the at least one element of the specific block, and the additional compression value can decided based on an error limit decided based on the block-characteristics quantization table. In embodiments, calculating the value obtained by deducting the additional compression value from the result obtained by quantizing the at least one element of the specific block using the quantization table as the final quantization result value of the at least one element of the specific block can include deciding the additional compression value that satisfies the following formula, $\Sigma q_i/2 + \Sigma p_i q_{i\le} T$, where $q_i$ is the value of the element in the quantization table, and p is the additional compression value, i is an element index, and T is the error limit.

In an aspect of the present invention, provided is an adaptive image compression method of quantizing blocks included in an image to be compressed using a quantization table commonly used in quantization of the blocks. The method can include: quantizing, at an image compression system, each of elements included in a specific block of the blocks included in the image to be compressed using the quantization table while quantizing the specific block; and for at least one element of the elements, selectively deducting an additional compression value from a quantization result value for each of the elements, wherein the additional compression value is decided based on a block-characteristics quantization table corresponding to the specific block decided based on a characteristic value of the specific block.

In an aspect of the present invention, provided is an adaptive image compression system for quantizing blocks included in an image to be compressed using a quantization table commonly used in quantization of the blocks. The system can comprise: a quantization table module defining the quantization table and a block-characteristics quantization table corresponding to a specific block of the blocks included in the image to be compressed; and a control module quantizing the specific block using a value of an element included in the quantization table and a value of an element included in the block-characteristics quantization table.

In embodiments of the adaptive image compression system, the control module can perform calculation using a value of a first element of the quantization table corresponding to a specific element of the specific block and a value of a second element of the block-characteristics quantization table corresponding to the specific element defined by the quantization table module in order to quantize the specific element. In embodiments, the control module can calculate an additional compression value decided based on the value of the first element and the value of the second element, and calculate a final quantization result value by deducting the additional compression value from a value obtained by quantizing the specific element based on the value of the first element.

In embodiments, the control module can calculate the additional compression value satisfying the following formula, $q_i/2+pq_i \leq q'_i/2$, where $q_i$ is the value of the first element, p is the additional compression value, $q'_i$ is the value of the second element, and i is an index of the elements.

A adaptive image compression system can include a characteristic determination module calculating a characteristic value of the specific block, wherein the quantization table module defines the block-characteristics quantization table previously decided according to the characteristic value determined by the characteristic determination module.

In embodiments, the control module can calculate a value obtained by deducting an additional compression value from a result obtained by quantizing the at least one element of the specific block using the quantization table as a final quantization result value of the at least one element of the specific block, and the additional compression value cab be decided based on an error limit decided based on the block-characteristics quantization table. In embodiments, the control module can decide the additional compression value that satisfies the following formula, $\Sigma qi/2+\Sigma piqi \leq T$, where qi is the value of the element in the quantization table, and p is the additional compression value, i is an element index, and T is the error limit.

In an aspect of the present invention, provided is an adaptive image compression system for quantizing blocks included in an image to be compressed using a quantization table commonly used in quantization of the blocks. The system can include a quantization table module defining the quantization table and a block-characteristics quantization table corresponding to a specific block of the blocks included in the image to be compressed; and a control module quantizing each of elements included in the specific block of the blocks included in the image to be compressed using the quantization table while quantizing the specific block, and selectively deducting an additional compression value corresponding to each of the elements for at least one element of the quantized elements, wherein the additional compression value is decided based on the block-characteristics quantization table corresponding to the specific block decided based on a characteristic value of the specific block.

According to a certain aspect of the present invention, at least one block of an image to be compressed is compressed at a greater quantization scale (or a greater degree of compression) in consideration of block characteristics while each of blocks of the image to be compressed is being quantized using one quantization table used for the image to be compressed. It is therefore possible to provide a compressed image within the range of similar image quality while providing a higher compression ratio.

When adjusting the DCT coefficient of a block included in an image to be compressed, it is possible to complete compression (adjustment in the DCT coefficient) by a single quantization process through simple calculation according to block characteristics instead of iteratively inspecting image quality after compression. Accordingly, the compression rate is significantly improved.

The methods and apparatuses of the present invention have other features and advantages that will be apparent from, or are set forth in greater detail in the accompanying drawings, which are incorporated herein, and in the following Detailed Description of the Invention, which together serve to explain certain aspects of the present invention.

BRIEF DESCRIPTION OF THE DRAWINGS

Brief descriptions of individual figures are given for better understanding of the drawings which are referred to in the Detailed Description of the Invention section.

DETAILED DESCRIPTION

The present invention has other advantages associated with the operation of the present invention and objects that are realized by the practice of the present invention which will be apparent from, or are set forth in greater detail in the accompanying drawings, which are incorporated herein, and in the following Detailed Description of the Invention, which together serve to explain certain aspects of the present invention.

The present invention will now be described more fully hereinafter with reference to the accompanying drawings, in which exemplary embodiments thereof are shown. Reference should be made to the drawings, in which the same reference numerals and signs are used throughout the different drawings to designate the same or similar components. Although an aspect of the present invention is applicable to all types of data compression methods, an application thereof to the JPEG will be described as a representative example.

According to an aspect of the present invention, method and system for compressing an image is provided. A computing system can be configured to analyze an image, identify a plurality of blocks in the image, determine characteristics of the plurality of blocks in the image, and generate a quantization table associated with the image using to determine characteristics of the plurality of blocks. For generating the quantization table, a computing system can determine an index representing characteristic of specific block in the image, determining an element (for example, discrete cosine transform coefficient) of the quantization table based on the determined index. While compressing the image using the quantization table, a computing device can conduct a first compression process and conduct a second compression process in addition to the first compression process. For example, the first compression process may a traditional compression process for generating a JPEG image using a single table. For obtaining a better compression rate of the image, a computing device can conduct the second compression process in addition to the first compression process. For conducting the second compression process, the computing device can examine blocks of the image, determine if a secondary compression process would be necessary (or beneficial). If it is determined that conducting the secondary compression process is necessary for a specific block, the computing device can refer a first element in the quantization table that corresponds to the specific block, determine a factor (value) for the secondary compression process using the first element (or a factor derived from the first element) and a target factor (for example, additional compression factor/value). Then, the computing system can conduct a compression process using the determined factor. The secondary compression process can be conducted selectively for a subset of all blocks in the image using a predetermined criterion.

Figure 1:
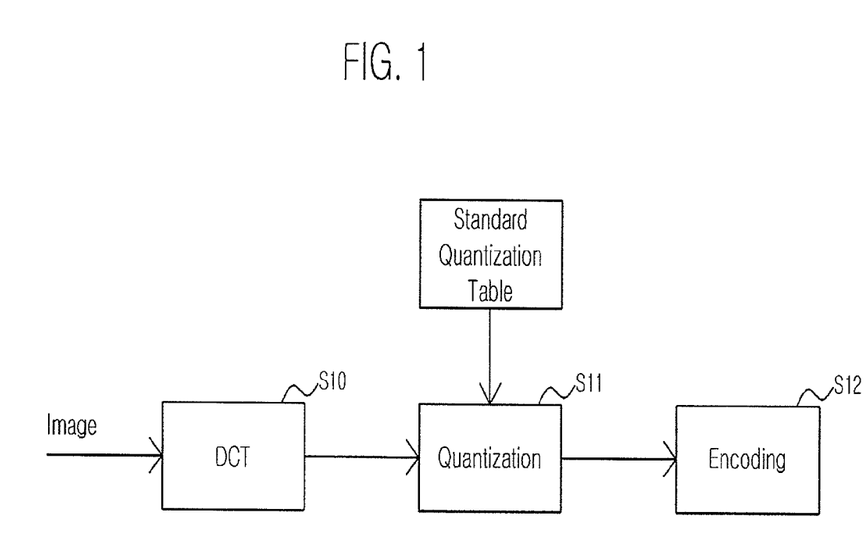
FIG. 1 is a block diagram schematically illustrating a method of generating a JPEG image of the related art.

FIG. 1 is a block diagram schematically illustrating a method of generating a JPEG image of the related art.

Referring to FIG. 1, the JPEG image generating method is a method of compressing and storing original images. The JPEG method includes: step S10 of converting an original image into a frequency domain data via discrete cosine transform (DCT); step S11 of lossy-compressing the converted data by quantizing the converted data using a quantization table (e.g. standard quantization table); and step S12 of generating a compressed image data by encoding the lossy-compressed data.

When the lossy-compression as in the (JPEG is carried out, most loss in information occurs during the quantization. Therefore, in this method, the image compression ratio mainly depends on the scale at which the quantization is performed.

However, it is preferred that an image be compressed within the range in which the visible image quality of a user does not greatly degrade. For example, although an increase in the image compression ratio (i.e. the increased quantization scale) has the effect of the decreased data size of the compressed image, this may significantly degrade the visual image quality, which is problematic. In addition, although a decrease in the image compression ratio does not significantly degrade the image quality, the degree to which the data is compressed is insignificant, which is problematic.

Therefore, a method of maximizing the compression ratio while maintaining visible image quality within the range of similar image quality (i.e. the range of image quality in which it is difficult to visually discriminate visible image quality from original image quality), i.e. a method of optimizing the compression ratio with respect to the image quality, is being actively studied.

Figure 2:
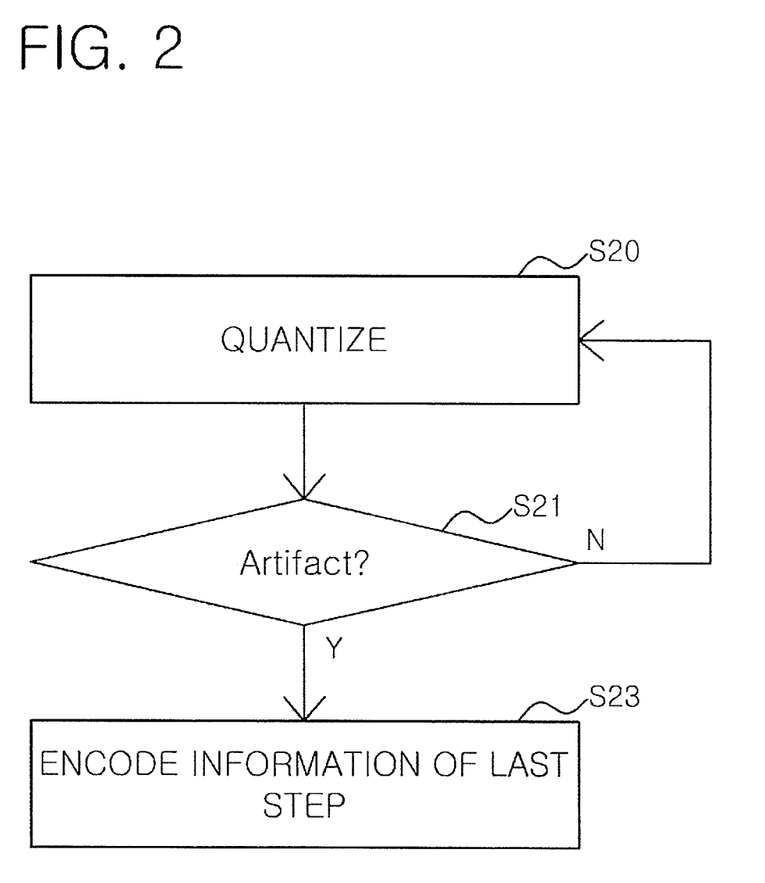
FIG. 2 is a flowchart schematically illustrating an iterative compression method of the related art.

A related method for image compression uses a scheme of searching for an optimization compression ratio by generally carrying out iterative compression (e.g. JPEG mini). FIG. 2 illustrates such an example of this method.

Referring to FIG. 2, the method of the related art includes: step S20 of quantizing an image that is converted into a data in a frequency domain at a predetermined quantization scale, i.e. adjusting DCT coefficients for blocks respectively; and step S21 of determining whether or not image quality has degraded. When the image quality has not degraded, the method iterates the step S20 of adjusting DCT coefficients for blocks respectively. In order to determine whether or not the image quality has degraded, it is possible to use a scheme of inspecting whether or not an artifact, i.e. an artificial image that causes discrepancies from similar image quality, has occurred. Of course, also in this case, the quantization can use a quantization table that corresponds to the quantization scale according to each step. When iterative compression goes on the quantization scale also can be increased until artifact has occurred. Iterative compression can be performed by adjusting DCT coefficient's (e.g. by deducting predetermined value from DCT coefficient's) at each step. In addition, when the artifact is produced due to the iterative compression, at step S23, the compression can be completed by encoding information that has been compressed in the previous steps.

However, such a compression method of the related art may be inefficient since whether the image to be compressed is a complicated image, the visual quality degradation of which is relatively little even though information loss of the image is big, or a simple image, the visual quality degradation of which is relatively significant even though information loss of the image is small, is not considered in quantization. In addition, the compression rate is slow since, once compression is carried out, it is iteratively determined whether or not to carry out the compression again or stop the compression.

In addition, it is impossible to ensure that the final result of the compression be the optimum compression ratio, which is problematic. This is because, when an artifact occurs in some quantization step, then the result of the previous quantization step becomes the final result of the compression. But, the result of the previous quantization step does not guarantee that the image is compressed at the optimization compression ratio.

An approach for overcoming these problems was disclosed in Korean Patent Application No. 10-2012-0091873, titled "ADAPTIVE IMAGE COMPRESSION SYSTEM AND METHOD," previously filed by the applicant of the present invention (hereinafter referred to as a "previous application"). The idea of the previous application and context can be reference of this application and can be handled to written in this application too.

Concept of the previous application is intended to carry out non-iterative compression by deciding a quantization level or scale that guarantees visual image quality according to the characteristics of an image. Specifically, the method of the previous application compresses an image by deciding a loss tolerance in which similar image quality is maintained by analyzing the characteristics of the image, deciding a quantization scale to be used in the compression, and subsequently generating an adaptive quantization table corresponding to the decided quantization scale. In this manner, the method can increase a compression ratio within the range of similar image quality through single compression.

However, according to the previous application, whole blocks included in an image to be compressed are quantized using a single quantization table (the adaptive quantization table of the previous application), a specific block of the image to be compressed is compressed at the same quantization scale even though the specific block may be quantized at a greater quantization scale than the other blocks.

This problem may occur commonly in an image compression method, such as the JPEG standard, defined to use a single quantization table for an image to be compressed. That is, an image compression method of quantizing a number of blocks using a single quantization table, such as the JPEG standard, uniformly compresses (quantizes) the number of blocks instead of compressing (quantizing) the blocks at different scales considering the characteristics of each block, i.e. the characteristics of each block relating to the scale of compression (quantization) in which the range of similar image quality is maintained.

Therefore, even if a single quantization table is used for the quantization of the number of blocks included in the image to be compressed, there is required a technical solution able to adaptively compress the blocks at different degrees considering the characteristics of each block. In addition, there is required a technical solution able to adjust a DCT coefficient at one time according to the quantization criteria which can make a previously-allowed limit of compression according to the characteristics of each block instead of iteratively adjusting the DCT coefficient or a increasing quantization scale as described above.

Figure 3:
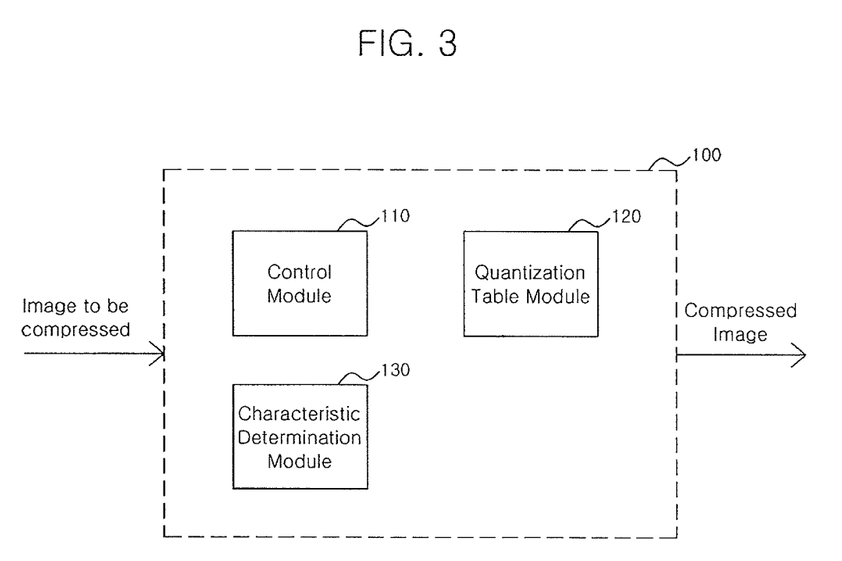
FIG. 3 is a block diagram illustrating the schematic configuration of an adaptive image compression system using block characteristics according to an exemplary embodiment of the present invention.

FIG. 3 is a block diagram illustrating the schematic configuration of an adaptive image compression system 100 using block characteristics according to an exemplary embodiment of the present invention.

Referring to FIG. 3, the adaptive image compression system using block characteristics (hereinafter referred to as the "adaptive image compression system") 100 according to an exemplary embodiment of the present invention includes a control module 110 and a quantization table module 120. The adaptive image compression system 100 further includes a characteristic determination module 130.

Although not shown in FIG. 3, it is apparent to a person skilled in the art to which the present invention pertains that the adaptive image compression system 100 may further include a type converter (not shown) and an encoder (not shown) or etc.

The adaptive image compression system 100 receives an image to be compressed as an input, compresses the image to be compressed by an adaptive image compression method using block characteristics according to the an aspect of the present invention, and outputs the compressed image.

The adaptive image compression system 100 may refer to a configuration that is disposed in a data processing apparatus (e.g. a computer or a mobile terminal) and is systematically combined with a set of hardware provided in the data processing apparatus and a set of software codes defined to embody an aspect of the present invention.

Herein, the term "module" may refer to a functional and structural combination between a set of hardware for embodying an aspect of the present invention and a set of software for enabling the hardware to operate. For example, the "module" may refer to a logical unit of predetermined codes and hardware resources supposed to carry out the codes, and it will be apparent to a person having ordinary skill in the art that the module is not limited to physically connected codes or one type of hardware.

In some implementations, the adaptive image compression system 100 may be distributed to a plurality of physical devices instead of one physical device. When individual components of the adaptive image compression system 100 are implemented as independent physical devices as required, these physical devices can be systematically combined via wired/wireless networks in order to realize the adaptive image compression system 100 according to an aspect of the present invention.

The control module 110 controls the functions and/or resources of the other components of the adaptive image compression system 100 (e.g. the quantization table module 120 and/or the characteristic determination module 130).

The quantization table module 120 defines a quantization table of an image to be compressed that the adaptive image compression system 100 will compress. In addition, the quantization table module 120 defines a block-characteristics quantization table corresponding to each of blocks included in the image to be compressed. Defining the quantization table and/or the block-characteristics quantization table may indicate previously creating and storing the quantization table and/or the block-characteristics quantization table in a storage device provided in the adaptive image compression system 100, or storing an algorithm or a set of information with which the quantization table and/or the block-characteristics quantization table can be created and creating the same as required.

The quantization table defined by the quantization table module 120 may be adaptively defined according to the image to be compressed, or may be a standard quantization table defined by the joint photographic experts group (JPEG) standard.

In addition, the quantization table module 120 may define a block-characteristics quantization table for each block. The block-characteristics quantization table may be defined for the whole blocks of the image to be compressed, or in some implementations, may be defined for only at least one predetermined block of the blocks. The predetermined block may be a block able to guarantee the range of similar image quality when quantized using the block-characteristics quantization table, the quantization scale of which is greater than that of the quantization table. That is, the quantization table module 120 may define the block-characteristics quantization table for only the block that may be additionally compressed (i.e. adjusted in a discrete cosine transform (DCT) coefficient) even after quantization using the quantization table. That is, the block is within the range of similar image quality. In addition, the additional compression may be defined as including the case of adjusting at least one coefficient of DCT coefficients (i.e. one of elements) of the block, i.e. decreasing the value of the quantized DCT coefficient.

The quantization table module 120 may define a block-characteristics quantization table for each block of the image to be compressed based on the characteristic value of the block. The characteristic value may be a reference value indicating the degree of quantization of a corresponding block in which the range of similar image quality is guaranteed. The characteristic value can be determined by the characteristic determination module 130.

The characteristic determination module 130 determines the characteristics of at least one of the blocks of the image to be compressed that is input into the adaptive image compression system 100. Specifically, the characteristic determination module 130 can determine characteristics related to compression, such as complexity, image quality, or type (e.g. gradation, strong edge, or texture), etc. Here, the determined characteristic indicates whether each block of the image to be compressed is a complicated image or a simple image. These characteristics of each block may be characteristics that must be considered since the adaptive image compression system 100 carries out lossy compression. This is because the visible quality of the image to be compressed may or may not be significantly influenced depending on the characteristics of the image when information is lost to a certain degree.

Therefore, according to an aspect of the present invention, when the characteristic value of a block is determined by the characteristic determination module 130, a block-characteristics quantization table corresponding to this block can be defined. Defining the block-characteristics quantization table may indicate defining the value of each element included in the block-characteristics quantization table. Consequently, the block-characteristics quantization table may refer to a quantization table corresponding to the value of the degree of quantization (according to the an aspect of the present invention) in which the image quality of a corresponding block is determined within the range of similar image quality even after the block is quantized according to the characteristics thereof.

This block-characteristics quantization table is defined by a predetermined method according to how the characteristic value of each block is defined. In addition, when the characteristic value is determined, the block-characteristics quantization table corresponding to the determined characteristic value may have been previously decided through experiments or some algorithm.

Theoretically, it is possible to acquire a high compression ratio by quantizing the whole blocks of an image to be compressed using corresponding block-characteristics quantization table. However, some image compression methods (e.g. JPEG) may be defined to quantize a single image to be compressed using the same quantization table. In this case, a method of increasing the compression ratio by properly and adaptively selecting a quantization table to be applied to the whole blocks may be employed.

However, even in the case in which the quantization table applicable to the whole blocks of the image to be compressed is properly defined, the image may have at least one specific block that can maintain similar image quality even after being additionally compressed (the scale quantization of which can be increased or the DCT coefficient of which can be adjusted) subsequent to quantization based on the quantization table, since the complexity or the like of the specific block is higher than that of the other blocks. In other words, the quantization scale of the block-characteristics quantization table corresponding to the specific block may be greater than that of the quantization table applied to the entire image to be compressed. Therefore, the specific block may be a block that can maintain similar image quality even in the case in which additional compression is carried out.

According to a certain aspect of the present invention, even in the case in which quantization is performed using the quantization table applicable to the whole blocks of the image to be compressed, block characteristics are considered such that the specific block can be quantized at a higher scale (higher compression) than when the specific block is quantized using the quantization table applicable to the whole blocks of the image.

For this, the control module 110 can perform quantization on each of the blocks included in the image to be compressed using the quantization table applicable to the entire image to be compressed. The term "quantization" may refer to the process of calculating a quantized value by quantizing the DCT coefficients (elements) according to the blocks using the quantization table. During this process, the control module 110 can additionally compress at least one element (DCT coefficient) of the specific block of the image to be compressed even after quantizing the element (DCT coefficient) using the quantization table. The term "additional compression" may refer to the process of specifying a final result value by deducting an additional compression value from the quantized value produced using the quantization table instead of using the quantized value itself as the final result value. In this case, the additional compression value may be a value decided based on the block-characteristics quantization table corresponding to the specific block.

The control module 110 calculates the additional compression value by receiving information about the block-characteristics quantization table corresponding to the specific block from the quantization table module 120. Thereafter, the control module 110 carries out additional compression by adjusting the quantized value using the quantization table based on the calculated additional compression value. This additional compression can be carried out for each element of the specific block.

According to an embodiment, the control module 110 determines whether or not a block that is being currently quantized is to be additionally compressed while quantizing each of the blocks of the image to be compressed using the quantization table. It is possible to determine whether or not to additionally compress the block based on the characteristic value thereof. Since the characteristic value of the block corresponds to the quantization scale thereof, when the quantization scale corresponding to the characteristic value of the block is greater than the quantization scale of the quantization table, the control module 110 determines the block to be additionally compressed. According to an alternative embodiment, the control module 110 determines whether or not each of the elements included in the blocks can be additionally compressed instead of separately determining whether or not the block that is being quantized can be additionally compressed. Each of the elements can be additionally compressed when the value of a first element of the quantization table corresponding to a specific element (DCT coefficient) included in the specific block is smaller than the value of a second element of the block-characteristics quantization table corresponding to the specific element. This may indicate that, when the value of the second element of the block-characteristics quantization table is greater, quantization using the quantization table indicates that the specific element is quantized based on the value of the first element smaller than the value of the second element although the specific element can be quantized based on the second element.

Therefore, in this case, the control module 110 additionally compresses the specific element by calculating a final quantization result value by deducting an additional compression value from a value quantized based on the first element.

Figure 4:
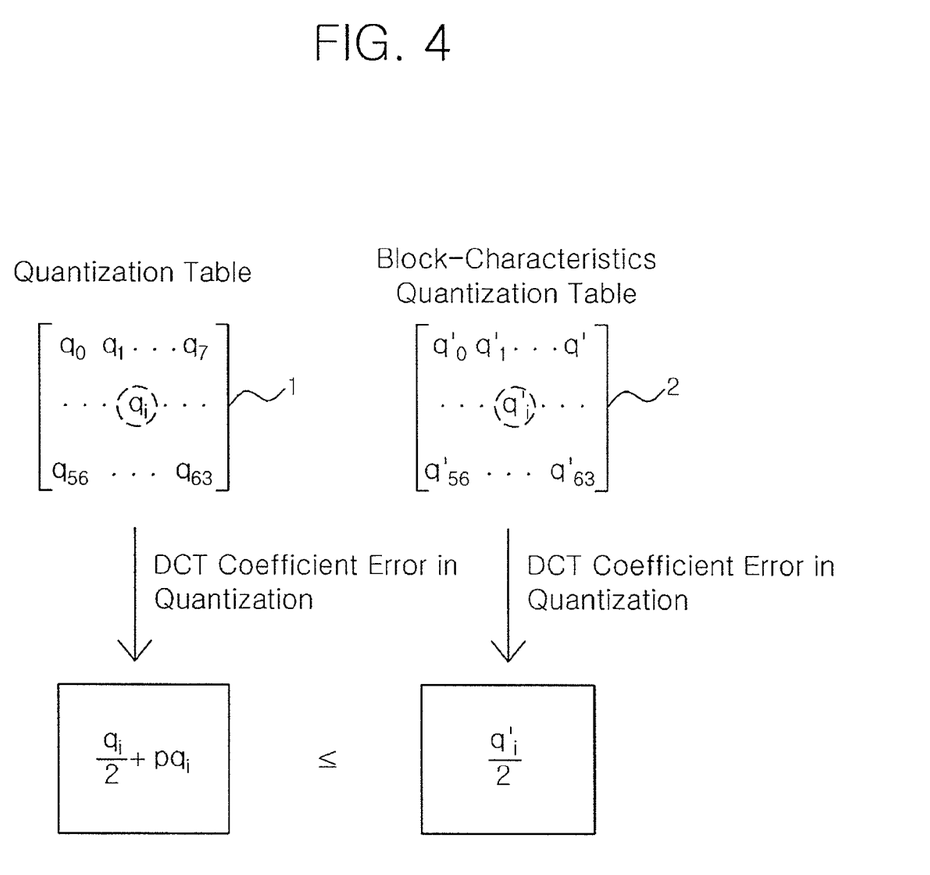
FIG. 4 illustrates a method of adjusting a DCT coefficient quantized by an adaptive image compression method using block characteristics according to an exemplary embodiment of the present invention.

An example of a method of determining the additional compression value according to a certain aspect of the present invention is illustrated in FIG. 4.

FIG. 4 illustrates a method of adjusting a DCT coefficient quantized by an adaptive image compression method using block characteristics according to an exemplary embodiment of the present invention.

Referring to FIG. 4, the quantization table module 120 defines a quantization table 1 used for an entire image to be compressed. The quantization table includes elements $q_0$ to $q_{63}$ when a block is divided into 8 by 8 pixels. When the image to be compressed is a JPEG image, the quantization table 1 may be a standard quantization table 1 defined by the JPEG standard. Alternatively, the quantization table 1 may be adaptively created according to the characteristics of the entire image to be compressed that are decided based on the characteristic values of blocks included in the image.

The quantization table module 120 defines a block-characteristics quantization table 2 of a specific block, as illustrated in FIG. 4. When the characteristic value of the specific block is determined by the characteristic determination module 130, the block-characteristics quantization table 2 can be decided based on the determined characteristic value. The quantization table module 120 may have information previously stored therein, the information being about the block-characteristics quantization table 2 corresponding to the characteristic value determined by the characteristic determination module 130, or may pieces of information stored therein, with which the block-characteristics quantization table 2 can be created. The block-characteristics quantization table 2 includes elements $q'_0$ to $q'_{63}$, as illustrated in FIG. 4.

The control module 110 quantizes the specific block using the quantization table 1. The quantization may be performed by the process of dividing each of the elements included in the specific block with a corresponding element of the quantization table 1 and calculating a quotient. The control module 110 first quantizes a specific element (a DCT coefficient corresponding to ($q_i(0 \leq i \leq 63)$)) of the specific block using a first element $q_i$ included in the quantization table 1, and subsequently determines whether or not the specific element can be additionally compressed. The possibility of additional compression is determined based on whether or not the first element $q_i$ is smaller than an element of the block-characteristics quantization table 2, i.e. a second element $q'_i$. That is, the additional compression is enabled when the second element $q'_i$ is greater than the first element $q_i$. This is because quantization can be performed using each of the elements included in the block-characteristics quantization table 2 since the block-characteristics quantization table 2 is predefined as a quantization table that guarantees similar image quality to the specific block. Thus, the second element $q'_i$ greater than the first element $q_i$ indicates that the additional compression is enabled.

When the specific element can be additionally compressed, the control module 110 calculates an additional compression value.

It is preferable that the additional compression value satisfies the case in which an error in the DCT coefficient when an additional compression value p is deducted from a value obtained by quantizing the specific element based on the first element $q_i$ is equal to or smaller than an error in the DCT coefficient when quantizing the specific element based on the second element $q'_i$.

That is, additional compression is carried out by deducting the additional compression value p from the value obtained by quantizing the specific element based on the first element $q_i$. When the specific element is quantized based on the first element $q_i$, the maximum error is $q_i/2$ since quantization is performed after rounding the specific element. The maximum error increases by $pq_i$ when p is deducted from the quantized value. Thus, when additional compression is performed by the additional compression value from the value obtained by quantizing the specific element based on the first element $q_i$, the maximum error in the DCT coefficient is $q_i/2+pq_i$.

In addition, when the specific element is quantized based on the second element $q'_i$, the maximum error in the DCT coefficient is $q'_i/2$.

Therefore, the additional compression value p satisfies the relationship: $(q_i/2+pq_i) \leq (q'_i/2)$, as illustrated in FIG. 4. The additional compression value p causes an error to be equal to or smaller than the error $q'_i/2$ produced from quantization based on the second element $q'_i$ that is a value allowed for quantization. When the additional compression value p satisfying this condition is deducted from the value obtained by quantizing the specific element based on the first element $q_i$, the final quantization result value due to additional compression of the specific element is produced.

In this manner, when each element of the specific block can be additionally compressed, the control module 110 selectively carries out additional compression. Consequently, while quantization using the quantization table 1 commonly applicable to the entire image to be compressed is performed on the specific block able to be compressed more than when being quantized using the quantization table, adaptive compression can actually be carried out on the specific block considering the characteristics of the specific block.

In addition, the compression (quantization) of the specific block is completed through simple calculation using the predefined block-characteristics quantization table 2. It is therefore possible to significantly increase the compression rate compared to an iterative compressing method of the related art.

According to another embodiment of the present invention, the additional compression of each element of the specific block or the additional compression value thereof may not be decided based on the value of the second element of the block-characteristics quantization table 2 corresponding to each of element and the value of the first element of the quantization table 1 corresponding to each element, but the additional compression value of at least one element of the specific block may be decided based on an error limit decided by the block-characteristics quantization table 2.

For example, the error limit decided by the block-characteristics quantization table 2 may indicate a total error that is allowed when the specific block is quantized using the block-characteristics quantization table 2. For example, the error limit may be defined simply by adding the errors of the respective elements that may occur when the specific block is quantized using the block-characteristics quantization table 2. For example, the error limit may be defined by the following formula: $T=\Sigma q'_i/2$. A variety of other methods may of course be used to decide the error limit using the block-characteristics quantization table 2 corresponding to the specific block.

This error limit may indicate the limit of an error that is allowed when the specific block is quantized. Therefore, even in the case in which at least one element of the specific block is additionally compressed after the specific block is quantized using the quantization table 1, the image quality may have no visual degradation when the total error of the specific block after the additional compression is within the range of the error limit.

In this case, the element to be additionally compressed may be arbitrarily selected, or may be decided based on a predetermined criteria. For example, an element to be additionally compressed may be decided by rate-distortion optimization (RDO). At least one element to be additionally compressed (hereinafter referred to as a "subject element") may be decided by a variety of methods. A value obtained by deducting an additional compression value from a result obtained by quantizing the subject element using the quantization table 1 (i.e. a result obtained by quantizing the subject element based on the value of an element in the quantization table 1 corresponding to the subject element) may be stored as a final quantization result value.

In this case, the control module 110 decides an additional compression value to be applied to each subject element such that the additional compression value satisfies the following formula:

$$\Sigma q_i/2 + \Sigma p_i q_i = T,$$

where $q_i$ is the ith element in the quantization table 1, $p_i$ is the additional compression value applied to the ith element of the specific block, and T indicates the error limit. The value of $p_i$ is equal to or greater than 0 ($p_i \geq 0$). The value of $p_i$ equal to 0 indicates that the corresponding element is not additionally compressed.

Consequently, in the above formula, the term $\Sigma q_i/2 + \Sigma p_i q_i$ indicates the total error after the specific block is quantized using the quantization table 1 and is additionally compressed. It is therefore possible to decide a subject element to be additionally compressed and an additional compression value to be applied to the subject element within the range in which the total error is smaller than or equal to the error limit.

The characteristic determination module 130 calculates a characteristic value for each block included in the image to be compressed.

A variety of methods of calculating the characteristic value may be used. In any case, the characteristic value may be defined as a reference value based on which the quantization scale of a specific block is determined.

Figure 5:
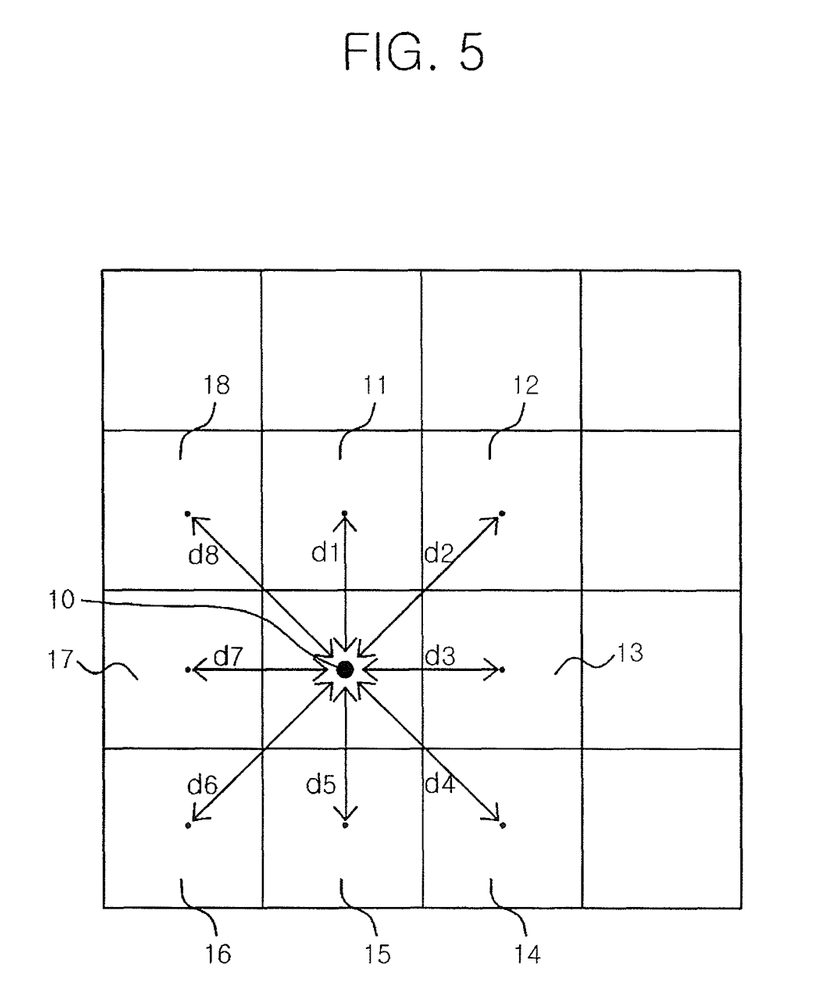
FIG. 5 illustrates a method of determining an image characteristic value for each block of an image to be compressed by the adaptive image compression method using block characteristics according to an exemplary embodiment of the present invention.

A method of determining a characteristic value according to an exemplary embodiment of the present invention is illustrated in FIG. 5.

FIG. 5 illustrates a method of determining an image characteristic value for each block of an image to be compressed by the adaptive image compression method using block characteristics according to an exemplary embodiment of the present invention.

Referring to FIG. 5 together with FIG. 3, after an image to be compressed is type-converted into a gray image by the type converter (not shown) included in the adaptive image compression system 100, a data of the image is input into the characteristic determination module 130. The gray image may be a data having, for example, a luminance value of the image, and may be stored in a buffer. The characteristic determination module 130 reads the data from the buffer. When an encoded image file (e.g. a JPEG file) is input into the adaptive image compression system 100, the encoded image file is subsequently input into the type converter (not shown) after being decoded by a decoder and converted into a data (e.g. an RGB raw image) corresponding to the original image.

The characteristic determination module 130 divides the image into a plurality of blocks. In an example, the characteristic determination module 130 sets the size of the block to 8 by 8 like the JPEG standard. However, this is not intended to the limiting.

The characteristic determination module 130 calculates the characteristic value of each of the divided plurality of blocks. The characteristic value indicates information presenting the characteristic of a part of the image or a partial image corresponding to the blocks. The characteristic value may relate to the degree to which the block can be compressed. Herein, the characteristic value is referred to as a block quality indicator (BQI).

Figure 6:
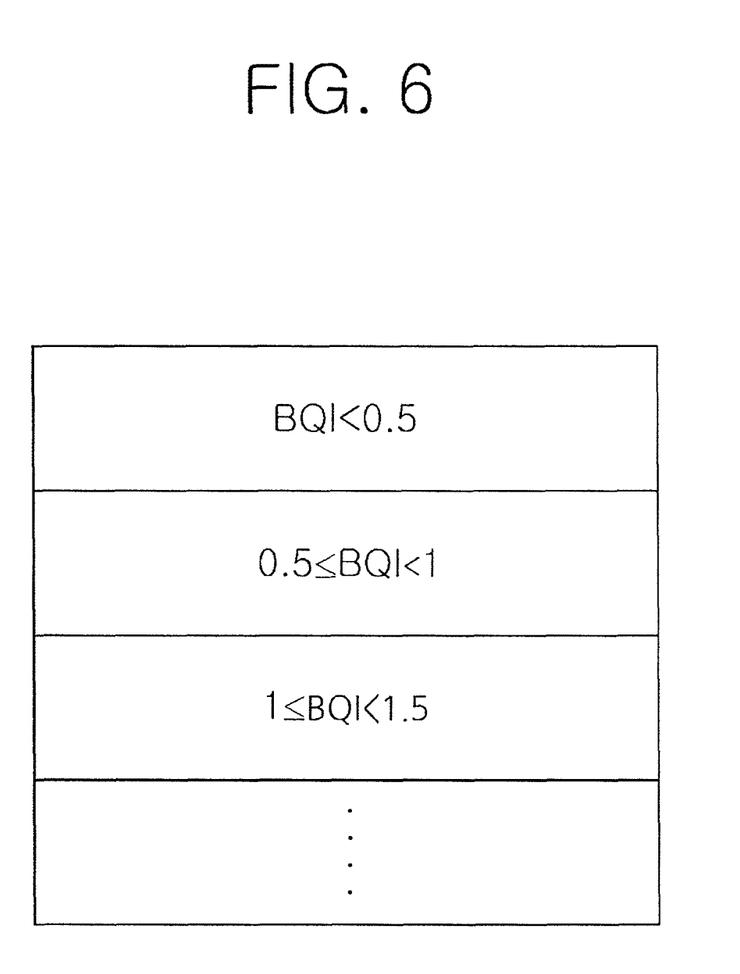
FIG. 6 illustrates a method of determining the characteristics of each block of an image to be compressed according to an exemplary embodiment of the present invention.

As illustrated in FIG. 6, the BQI can be calculated by the average of each of the differential values of the pixels included in the block. A high average of the differential values may indicate that the complexity of the partial image corresponding to the block is high or that luminance changes significantly within the partial image. In addition, a high average of the differential values, i.e. a high BQI, may generally indicate that a decrease in the visual image quality is relatively insignificant when compression is carried out to a high degree.

A differential value of one pixel (e.g. 10) included in the block may indicate the average of the differences d1 to d7 between the value of the pixel 10 and the values of the surrounding pixels 11 to 17. When the differential value of one pixel included in the block is decided in this manner, the differential values of the other pixels may be decided in the same manner. Consequently, the characteristic determination module 130 calculates the differential value of each of the pixels included in the block and subsequently calculates the BQI of the block.

When the characteristic value, i.e. the BQI, of the specific block is calculated in this manner, the block-characteristics quantization table corresponding to the calculated BQI is decided. The block-characteristics quantization table corresponding to the BQI can be decided through iterative experiments, and can be predefined by the quantization table module 120. When the BQI of the specific block is calculated, the block-characteristics quantization table corresponding to the calculated BQI may have been previously decided through experiments or by any method, and information about the predetermined block-characteristics quantization table may have been previously stored in the quantization table module 120. In some implementations, the quantization table module 120 creates the block-characteristics quantization table based on the BQI by a predetermined method. For example, the block-characteristics quantization table is created by scaling the values of the elements of a standard quantization table based on the value of the BQI.

In any case, according to an aspect of the present invention, the block-characteristics quantization table is defined based on the characteristics according to the blocks (i.e. the characteristic values). The adaptive image compression system 100 can carry out additional compression by adjusting the quantized values using the quantization table based on the block-characteristics quantization table.

The quantization table applicable to the entire image to be compressed is decided based on the characteristics of the image to be compressed. The characteristics of the image to be compressed are decided based on the characteristic value of the blocks, i.e. BQIs.

There is a variety of methods of determining the characteristics of the image to be compressed based on the BQI. For example, a representative value, such as an arithmetic mean of the BQI, may be determined based on the characteristics of the image to be compressed. The characteristics of the entire image to be compressed may be decide based on the BQI by any method. The characteristics may indicate predetermined values presenting the degree to which the image to be compressed can be compressed or a combination or a statistical value of such BQIs. There is a variety of implementations able to determine the characteristics in this manner.

According to an embodiment, the quantization table module 120 classifies each of a plurality of BQIs based on a classification standard, the BQIs corresponding to a plurality of blocks determined by the characteristic determination module 130. That is, the characteristics of the plurality of blocks are classified based on the classification standard. In addition, the characteristics of the entire image to be compressed are determined based on the results of classification.

Such an example is illustrated in FIG. 6.

FIG. 6 illustrates a method of determining the characteristics of an image to be compressed according to an exemplary embodiment of the present invention.

Referring to FIG. 6, the quantization table module 120 may have previously stored a standard based on which the BQIs of the blocks are classified into predetermined ranges. Based on the standard, blocks, the BQI of each of which is in a first range (e.g. a range in the which the BQI is smaller than 0.5), are classified in a first category, blocks, the BQI of each of which is in a second range (e.g. a range in which the BQI is equal to or greater than 0.5 and equal to or smaller than 1), is classified in a second category, and blocks, the BQI of each of which is in a third range (e.g. a range in which the BQI is equal to or smaller than 1 and equal to or smaller than 1.5), are classified in a third category.

In this manner, blocks having similar characteristics are classified in the same category. Therefore, the quantization table module 120 decides the characteristics of the entire image to be compressed depending on how many blocks of the blocks included in the image to be compressed belong to specific categories, and defines the quantization table according to the decided characteristics. For example, a large number of blocks corresponding to the first category indicates that the image quality of the block has no visual degradation when the compression ratio is small. In this case, the quantization table module 120 determines that image quality has no visual degradation when the compression ratio of the entire image to be compressed is small. Consequently, a suitable quantization scale factor (QSF) is decided. The quantization table module 120 decides the QSF indicating the characteristics of the image to be compressed, i.e. the degree to which the image to be compressed is compressed, based on the numbers of blocks corresponding to not only the first category but also the other categories.

The classification standard of BQIs, i.e. reference values by which the BQIs are classified, and QSFs to be decided based on the classified BQIs may have been previously decided through experiments and previously stored in the adaptive image compression system 100. For example, a reference value (e.g. 0.5) based on which the first category is decided is set through iterative experiments and by verifying the results of compression. In addition, information about the experimentally-decided QSF values, i.e. a QSF determination list, experimentally decided according to the types of values of the BQIs, the distribution of the BQIs, or the numbers of blocks belonging to specific categories (i.e. the ratios of the blocks belonging to specific categories in the whole blocks) may have been stored in the adaptive image compression system 100. The QSFs may be decided based on the QSF determination list.

When the QSFs are decided by the quantization table module 120, the quantization table module 120 creates an adaptive quantization table based on the decided QSFs. The standard quantization table may be used in order to create the adaptive quantization table. A detailed description of the technical aspect of defining the entire characteristics of the image to be compressed based on the characteristic values of the blocks and defining the quantization table will be omitted cause one of ordinary in the art would understand various approaches for defining characteristics of the image.

Consequently, according to an aspect of the present invention, at least one block can be quantized at a different quantization scale while quantization is being performed using one quantization table. In addition, unlike the related-art method of iteratively inspecting whether or not an artifact is present after compression, it is possible to complete compression in a single time by previously deciding the degree to which an image to be compressed will be compressed or additionally compressed, thereby significantly improving the compression rate.

The adaptive image compression method according to an embodiment of the present invention may be embodied as computer readable codes stored in a computer readable recording medium. The computer readable recording medium includes all sorts of record devices in which data readable by a computer system are stored. Examples of the computer readable recording medium include read only memory (ROM), random access memory (RAM), compact disc read only memory (CD-ROM), a magnetic tape, a hard disk, a floppy disk, an optical data storage device and the like. Further, the recording medium may be implemented in the form of a carrier wave (e.g. Internet transmission). In addition, the computer readable recording medium may be distributed to computer systems on the network, in which the computer readable codes are stored and executed in a decentralized fashion. In addition, functional programs, codes and code segments for embodying the present invention can be easily construed by programmers having ordinary skill in the art to which the present invention pertains.

While the present invention has been described with reference to the certain exemplary embodiments shown in the drawings, it will be understood by a person skilled in the art that various modifications and equivalent other embodiments may be made therefrom. Therefore, the true scope of the present invention shall be defined by the concept of the appended claims.

What is claimed is:

1. An adaptive image compression method for compressing an image comprising a plurality of image blocks, each of the plurality of image blocks corresponding to a pixel array having a predetermined size in the image, the method comprising:

transforming each of the plurality of image blocks, using Discrete Cosine Transform (DCT), to a corresponding block of DCT coefficients such that the plurality of image blocks are transformed to a plurality of DCT coefficient blocks;

quantizing each of the plurality of the DCT coefficient blocks to a corresponding quantized block using a primary quantization table such that the plurality of DCT coefficient blocks are quantized to a plurality of quantized blocks using the same primary quantization table;

for a particular element of a particular quantized block corresponding to a particular image block and using a secondary quantization table that is defined using a characteristic value computed based on values of pixels in the particular image block, determining whether a first value of the primary quantization table corresponding to the particular element is smaller than a second value of the secondary quantization table corresponding to the particular element;

if it is determined that the first value is less than the second value, adjusting the particular element of the particular quantized block using the first value and the second value such that the particular quantized block is further updated after quantization using the primary quantization table using the secondary quantization table and such that the particular image block is further compressed using the secondary quantization table.

2. The method according to claim 1, further comprising:
subsequent to adjusting the particular element, generating a compressed image using the particular quantized blocks.

3. The method according to claim 2, wherein adjusting the particular element comprises:
  calculating an additional compression value using the first value and the second value; and
  updating value of the particular element by subtracting the additional compression value.

4. An adaptive image compression method of quantizing blocks included in an image to be compressed using a quantization table commonly used quantization of the blocks, the method comprising:
  checking, at an image compression system, a block-characteristics quantization table corresponding to a specific block of the blocks included in the image in order to quantize the specific block; and
  quantizing the specific block using a value of an element included in the quantization table and a value of an element included in the block-characteristics quantization table,
  wherein, in order to quantize a specific element of the specific block, quantizing the specific block comprises performing calculation using a value of a first element of the quantization table corresponding to a specific element and a value of a second element of the checked block-characteristics quantization table corresponding to the specific element,
  wherein performing calculation using the value of the first element of the quantization table corresponding to the specific element and the value of the second element of the checked block-characteristics quantization table corresponding to the specific element block-characteristics quantization table comprises:
    calculating, at the image compression system, an additional compression value decided based on the value of the first element and the value of the second element; and
    calculating, at the image compression system, a final quantization result value by deducting the additional compression value from a value obtained by quantizing the specific element based on the value of the first element,
  wherein, at the process of calculating the additional compression value decided based on the value of the first element and the value of the second element, the additional compression value satisfies the following formula:

$q_i/2 + pq_i \leq q'_i/2,$ where $q_i$ is the value of the first element, p is the additional compression value, $q'_i$ is the value of the second element, and i is an index of the elements.

5. The adaptive image compression, method according to claim 4, further comprising calculating, at the image compression system, a characteristic value of the specific block,
  wherein checking the block-characteristics quantization table corresponding to the specific block comprises checking the block-characteristics quantization table previously decided based on the characteristic value.

6. The adaptive image compression method according to claim 5, wherein calculating the characteristic value of the specific block comprises calculating, at the image compression system, an average of each of differential values of the pixels included in the specific block as the characteristic value,
  wherein each of the differential values is an average of differences between a pixel value of the specific pixel and pixel values of pixels surrounding the specific pixel.

7. The adaptive image compression method according to claim 4, further comprising calculating, at the image compression system, characteristic values of the blocks included in the image to be compressed and deciding the quantization table based on each of the characteristic values of the blocks.

8. A non-transitory computer readable storage medium storing computer-executable instructions for enabling the method as claimed in claim 4.

9. An adaptive image compression method of quantizing blocks included in an image to be compressed using a quantization table commonly used in quantization of the blocks, the method comprising:
  checking, at an image compression system, a block-characteristics quantization table corresponding to a specific block of the blocks included in the image in order to quantize the specific block; and
  quantizing the specific block using value of an element included in the quantization table and a value of an element included in the block-characteristics quantization table,
  wherein quantizing the specific block comprises calculating a value obtained by deducting an additional compression value from a result obtained by quantizing at least one element of the specific block using the quantization table as a final quantization result value of the at least one element of the specific block,
  wherein the additional compression value decided based on an error limit decided based on the block-characteristics quantization table,
  wherein calculating the value obtained by deducting the additional compression value from the result obtained by quantizing the at least one element of the specific block using the quantization table as the final quantization result value of the at least one element of the specific block comprises deciding the additional compression value that satisfies the following formula:

$\Sigma q_i/2 + \Sigma p_i q_i = T,$ where $q_i$ is the value of the element in the quantization table, and p is the additional compression value, i is an element index, and T is the error limit.

10. A non-transitory computer readable storage medium storing computer-executable instructions for enabling the method as claimed in claim 9.

11. An adaptive image compression system for quantizing blocks included in an image to be compressed using a quantization table commonly used in quantization of the blocks the system comprising:
  a quantization table module defining the quantization table and a block-characteristics quantization table corresponding to specific block of the blocks included in the image to compressed; and
  a control module quantizing the specific block using a value of an element included in the quantization table and a value of an element included in the block-characteristics quantization table,
  wherein the control module performs calculation, using a value of a first element of the quantization table corresponding to a specific element of the specific block and a value of a second element of the block-characteristics quantization table corresponding to the specific element defined by the quantization table module in order to quantize the specific element,
  wherein the control module calculates an additional compression value decided based on the value of the first element and the value of the second element, and calculates a final quantization result value by deducting the additional compression value from a value obtained by quantizing the specific element based on the value of the first element, wherein the control module calculates the additional compression value satisfying the following formula:

$$q_i/2 + pq_i \leq q'_i/2$$

where $q_i$ is the value of the first element, p is the additional compression value, $q'_i$ is the value of the second element, and i is an index of the elements.

12. The adaptive image compression system according to claim 11, further comprising a characteristic determination module calculating a characteristic value of the specific block, wherein the quantization table module defines the block-characteristics quantization table previously decided according to the characteristic value determined by the characteristic determination module.

13. The adaptive image compression system according to claim 11, wherein the control module calculates a value obtained by deducting an additional compression value from a result obtained by quantizing the at least one element of the specific block using the quantization table as a final quantization result value of the at least one element of the specific block, and wherein the additional compression, value is decided based on an error limit decided based on the block-characteristics quantization table.

* * * * *